(12) United States Patent
Shen (10) Patent No.: US 7,698,438 B1
(45) Date of Patent: Apr. 13, 2010

(54) UPDATING OF AVAILABILITY OF ROUTES IN A NETWORK

(75) Inventor: Naiming Shen, San Jose, CA (US)

(73) Assignee: Redback Networks Inc., San Jose, CA (US)

( * ) Notice: Subject to any disclaimer, the term of this patent is extended or adjusted under 35 U.S.C. 154(b) by 864 days.

(21) Appl. No.: 10/281,619

(22) Filed: Oct. 28, 2002

Related U.S. Application Data (60) Provisional application No. 60/387,023, filed on Jun. 7, 2002.

(51) Int. Cl.
*G06F 15/16* (2006.01)

(52) U.S. Cl. ...................................................... 709/228

(58) Field of Classification Search ................. 709/224, 709/238, 218, 227, 228; 370/242, 396
See application file for complete search history.

(56) References Cited

U.S. PATENT DOCUMENTS

| | | | | |
|---|---|---|---|---|
| 5,353,283 A | * | 10/1994 | Tsuchiya | 370/392 |
| 5,636,371 A | * | 6/1997 | Yu | 703/26 |
| 5,680,116 A | * | 10/1997 | Hashimoto et al. | 370/254 |
| 5,734,865 A | * | 3/1998 | Yu | 709/250 |
| 6,006,264 A | * | 12/1999 | Colby et al. | 709/226 |
| 6,226,684 B1 | * | 5/2001 | Sung et al. | 709/238 |
| 7,032,034 B1 | * | 4/2006 | Tenneti et al. | 709/249 |
| 7,257,646 B2 | * | 8/2007 | Jonsson | 709/244 |
| 7,269,176 B1 | * | 9/2007 | Molinari | 370/401 |
| 2001/0046227 A1 | * | 11/2001 | Matsuhira et al. | 370/355 |

OTHER PUBLICATIONS

Stevens, W.R., TCP/IP Illustrated, vol. 1: The Protocols, 1994, Addison Wesley, vol. 1, pp. 104-105.*
Stevens, Richard W., TCP/IP Illustrated, vol. 1: The Protocols, 1993, Addison Wesley Professional, pp. iv, 69-71, and 85-95.*

* cited by examiner

*Primary Examiner*—Jeffrey Pwu
*Assistant Examiner*—Alicia Baturay
(74) *Attorney, Agent, or Firm*—Blakely, Sokoloff, Taylor & Zafman LLP (57) ABSTRACT

In one embodiment, a method comprises transmitting a PING from a network element to a computing device, wherein a static route is between the network element and the computing device. The method also includes causing a distribution of availability of the static route to at least one other network element based on whether the computing device responded to the PING.

27 Claims, 7 Drawing Sheets

UPDATING OF AVAILABILITY OF ROUTES IN A NETWORK

CROSS REFERENCE TO RELATED APPLICATION

This application claims the benefit of U.S. provisional patent application No. 60/387,023 entitled "Updating of Availability of Routes in a Network," filed Jun. 7, 2002.

FIELD OF THE INVENTION

The invention relates to the field of communications. More specifically, the invention relates to updating of availability of routes in a network.

BACKGROUND OF THE INVENTION

In the field of communications and networking, a number of approaches are employed for establishing routes within a network. A first approach is based on static routing protocols wherein a network administrator typically provisions the routes within the network, thereby provisioning the routing tables stored in different network elements (such as routers). Accordingly, this static routing enables the path through the network that the data traverses to be known and allows for a greater degree of control in comparison to routing based on dynamic routing protocols (discussed below). Disadvantageously, if links or network elements within the static route are unavailable or are not operating, data attempting to be transmitted through the static route is lost or not routed.

A second approach for establishing routes within a network is based on dynamic routing, wherein dynamic routing protocols, such as Border Gateway Protocol (BGP) and Interior Gateway Protocol (IGP), are employed. Such dynamic routing protocols enable network elements within a network to announce or advertise which network elements that they are coupled to in the network. Accordingly, the network elements are able to make intelligent route selection based on an understanding of the network topology because of the data received from such dynamic routing protocols. Therefore, the network elements are aware if a link or network element is unavailable and modify the route to traverse a different link and/or network element within the network. Furthermore, the network elements can be configured to allow for the distribution of static routes using the dynamic routing protocols. Accordingly, the network element can announce static routes that it is aware to other network elements in the network.

Moreover, within networks, the storage of data, such as web pages from various web sites, can be stored in a bank of servers known as a web farm. In particular, a web farm can store web pages from a number of different web sites. Further, a given web page can be stored across different web farms. For example, a given web page may be stored in web farms within the United States as well as web farms in various European and Asian countries. Accordingly, if a web page cannot be retrieved from one web farm because of equipment failure related to the servers therein, the web page may be retrieved from other web farms.

In a typical network configuration, the bank of servers within a web farm are coupled to the network through an edge router using static routes. In operation, the edge router announces these static routes to other network elements in the network using dynamic routing protocols (as described above). However, in such a configuration, if the static route becomes unavailable (because the server or link is "down" for example), the static routing protocols do not provide a mechanism to determine this unavailability. Accordingly, when requests are made for web pages for a given static route that is unavailable from the edge router, the edge router is unable to retrieve this web page for the requesting device.

A conventional approach to preclude such a scenario is to have the bank of servers and the edge router include communications based on a dynamic routing protocol, thereby enabling a server within the bank of servers to communicate the availability of routes between itself and the edge router. Accordingly, this router can announce the changes in the availability of routes learned between itself and the bank of servers to other network elements in the network. Requests will, therefore, not be made to the edge router for a given web page that is unavailable because a route is "down", thereby allowing the requesting device to obtain the web page from another server in another web farm. Disadvantageously, this approach requires that the servers become pseudo routers by requiring communications based on the dynamic routing protocol. Furthermore, servers within a web farm can be based on different manufacturers and executing different operating systems. For example, a first server can be a workstation that is executing a first type of operating system, while a second server can be a personal computer that is executing a second type of operating system. Accordingly, the different servers may have to execute different types of dynamic routing protocol software. Moreover, as described, this approach can be expensive through the installation of this routing software on each of the different servers across different web farms.

Another typical approach to preclude having an edge router announcing the availability of a web page when the route for this page is not accessible within a server of a bank of servers encompasses periodic checks and updates by the web sites that are allowing their web pages to be hosted within the web farm. In particular, a computing or monitoring device external to the edge router and the web farm checks availability of web pages within the web farm. Upon determining that a web page is unavailable, the computing device logs into the edge router and modifies the static routing tables therein to remove the associated static route. Additionally, this computing device can continue to check when the web page is subsequently available and again log into the edge router to modify the static routing tables therein to add the associated static route. However, as described, such an approach can require a separate monitoring device, developing associated monitoring software and a flood of logins into the edge router and modification to the static routing tables therein.

SUMMARY OF THE INVENTION

A method and apparatus for updating the availability of routes in a network are described. In one embodiment, a method comprises transmitting a PING from a network element to a computing device, wherein a static route is between the network element and the computing device. The method also includes causing a distribution of availability of the static route to at least one other network element based on whether the computing device responded to the PING.

In an embodiment, a method comprises generating, by a network element, a number of PING messages, wherein a sequence field of the PING messages is to include an identification of a dynamically verified static route from among a number of dynamically verified static routes between the network element and a device. The dynamically verified static route is associated with data of a number of data stored in the device. The method also includes transmitting the number of PING messages to the device from the network element. Additionally, the method includes announcing the unavailability of the data to other network elements, upon not receiving a predetermined number of responses to the number of PING messages from the device. Further, the method includes announcing the availability of the data to other network elements, upon receiving a predetermined number of responses to the number of PING messages from the device.

In one embodiment, a network element comprises a routing table to store entries related to a number of static routes between the network element and a number of data within a computing device. The network element also comprises a dynamically verified static route logic to PING the number of data within the computing device. The dynamically verified static route logic is to update the entries related to the number of static routes within the routing table based on the responses to the PINGs from the computing device.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of the Figure. For example, system 100 can be located in FIG. 1. However, element numbers are the same for those elements that are the same across different Figures. In the drawings.

DETAILED DESCRIPTION

A method and apparatus for updating the availability of routes in a network are described. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In one embodiment, static routes between a network element and a server within a bank of servers are updated based on a dynamic routing protocol. In an embodiment, this updating occurs independent of having the servers within the bank of servers to act as pseudo routers through execution of dynamic routing protocol communications with the network element. In an embodiment, logic within the network element PINGs the different addresses associated with the different static routes within the bank of servers to determine the availability of such routes. Moreover, based on the response to such PINGs, this logic determines whether to update static routing tables within the network element that are redistributed to dynamic routing protocol logic therein. Accordingly, this dynamic routing protocol logic is able to communicate the modifications in the availability of static routes to other network elements in the network. As will be described in more detail below, in one embodiment, modifications are made to the fields within a PING message in tracking the availability of these static routes. While described with reference to PING communications, embodiments of the invention are not so limited. In other embodiments, other types of "keep alive" mechanisms can be employed in the determination of the availability of such static routes.

Embodiments of the invention are described with reference to a given system based on communications between a number of servers within a web farm and an edge router. However, embodiments of the invention are not so limited. Other systems employing the type of static routing communications described herein can incorporate embodiments of the invention. Examples of such systems are described below.

Figure 1:
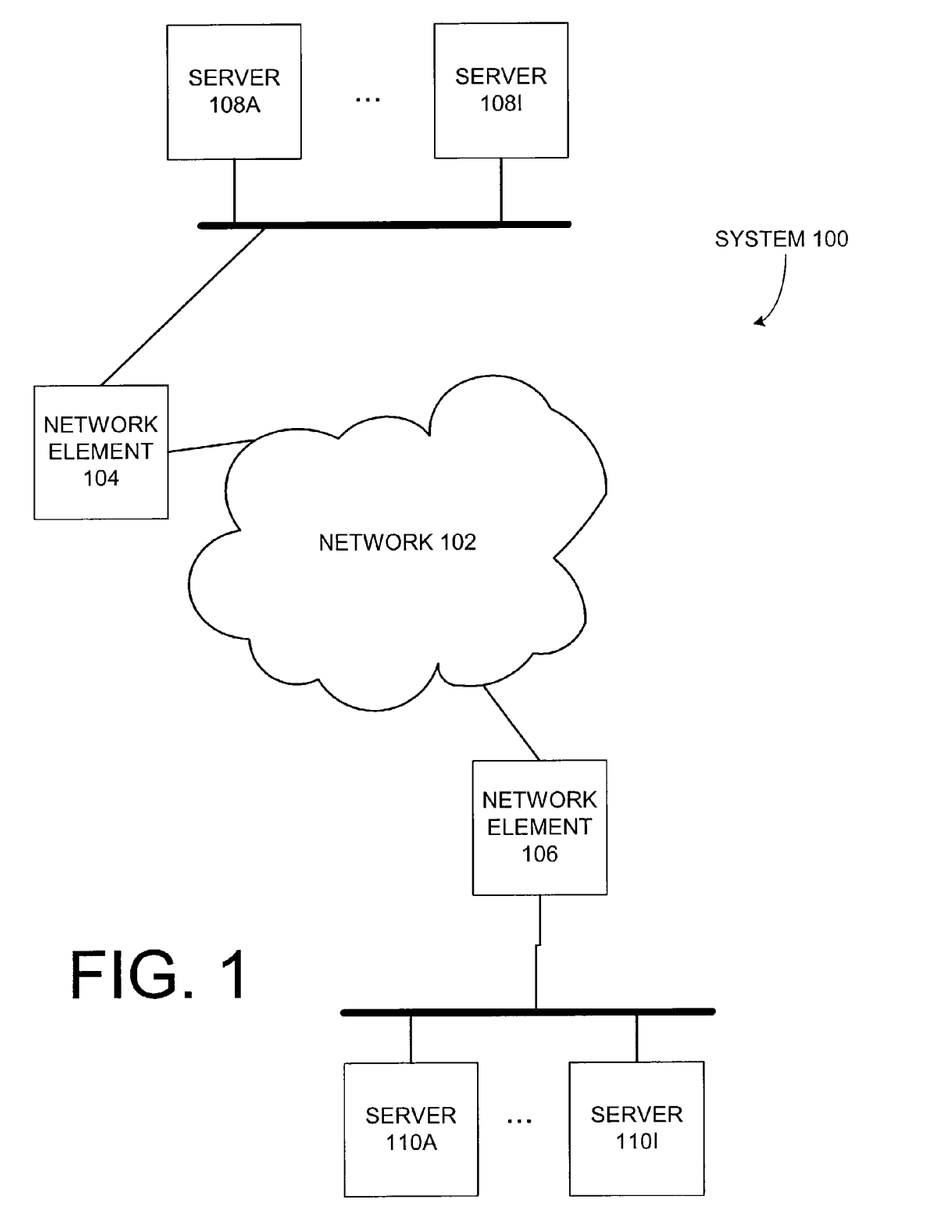
FIG. 1 illustrates a block diagram of a system for updating the availability of routing in a network, according to one embodiment of the invention.
Figure 2:
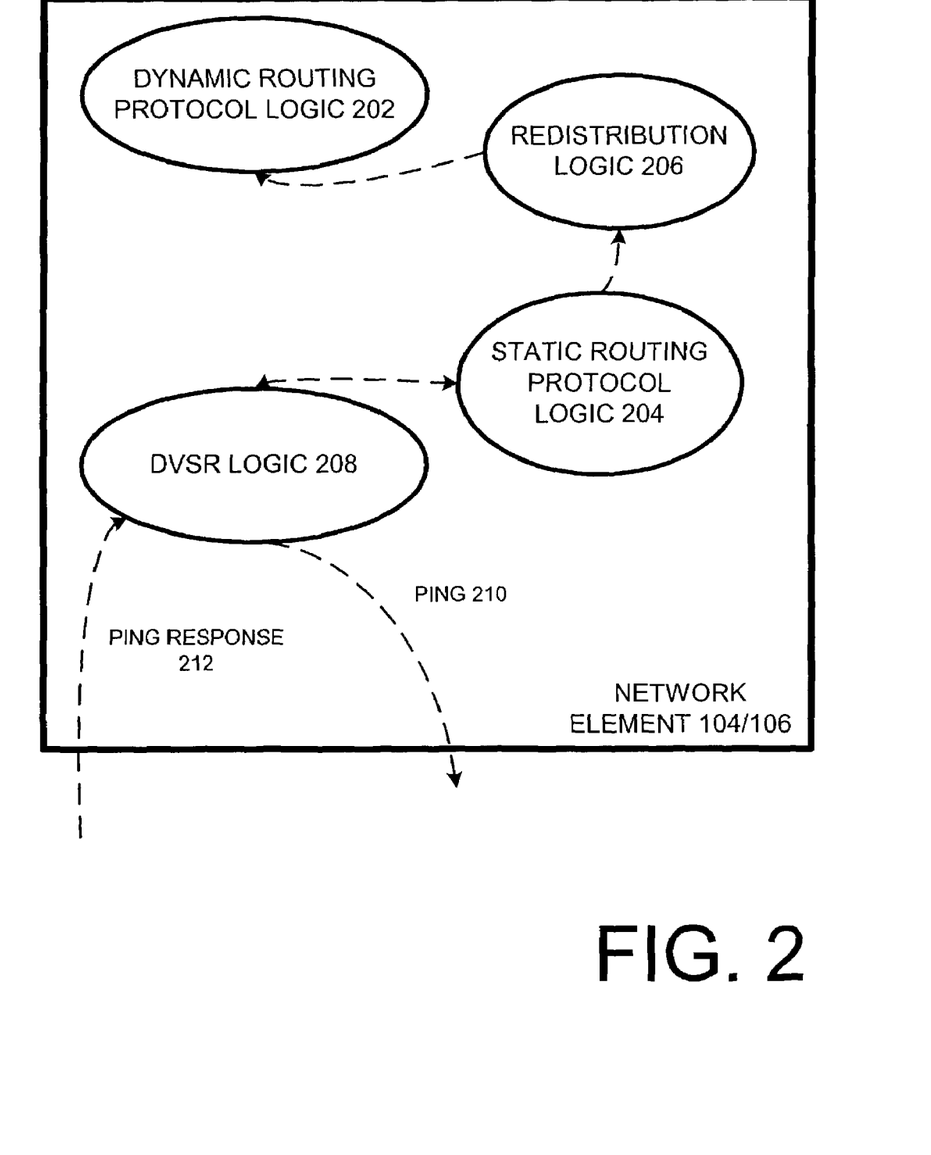
FIGS. 2 and 3 illustrate more detailed block diagrams of a network element for updating the availability of routing in a network, according to one embodiment of the invention.
Figure 3:
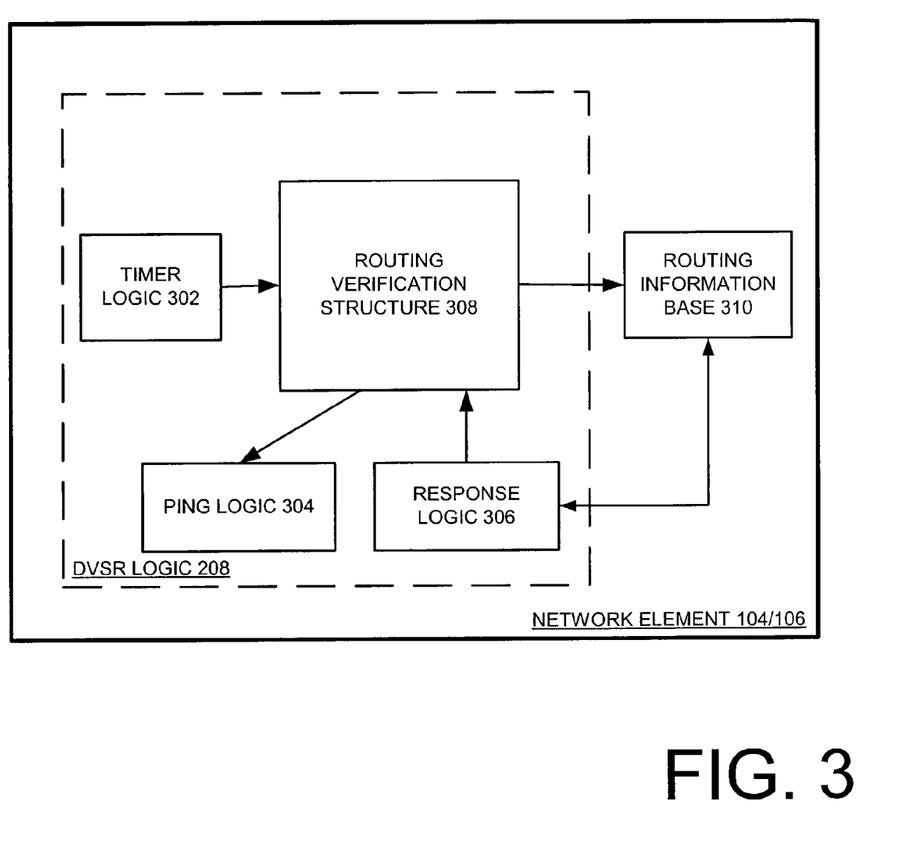
Figure 4:
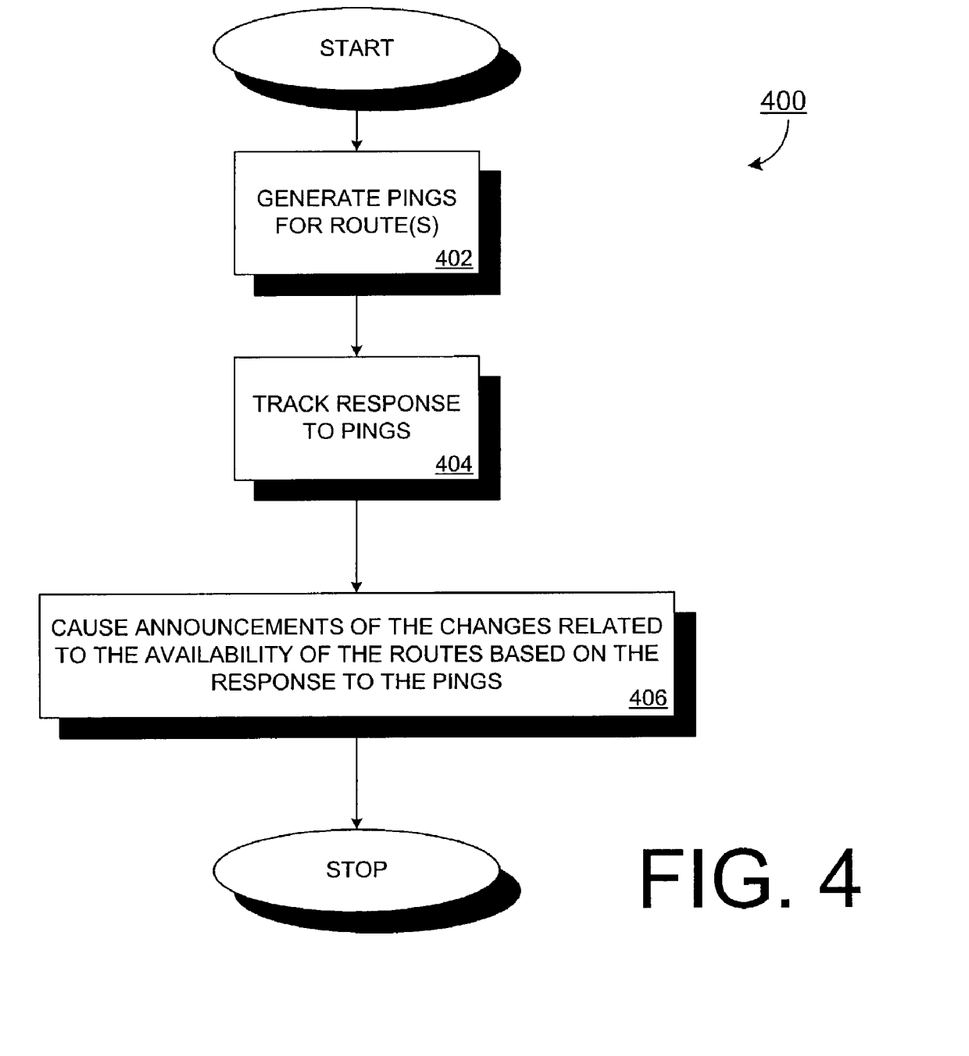
FIG. 4 illustrates a flow diagram for updating the availability of a static route within a network, according to one embodiment of the invention.
Figure 5:
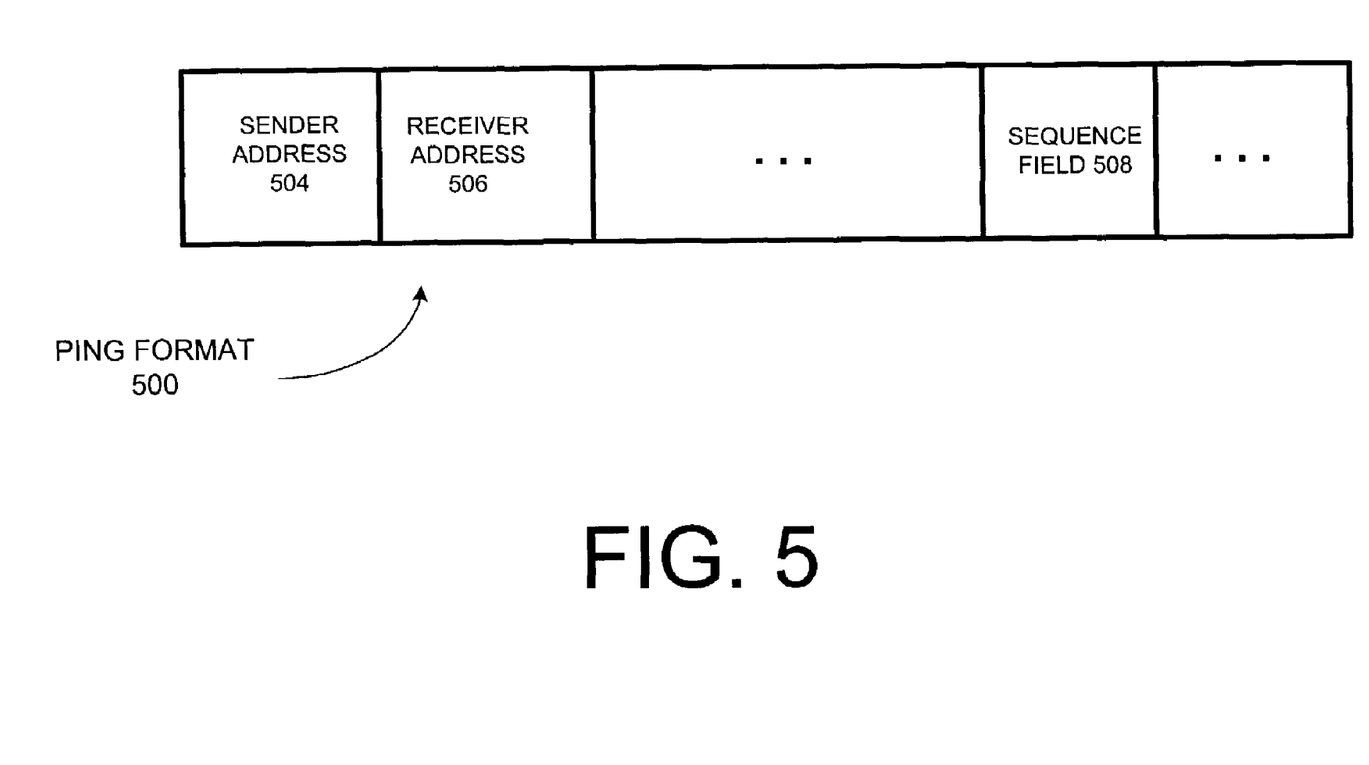
FIG. 5 is a block diagram of a format for a Packet Internet Groper (PING), according to one embodiment of the invention.
Figure 7:
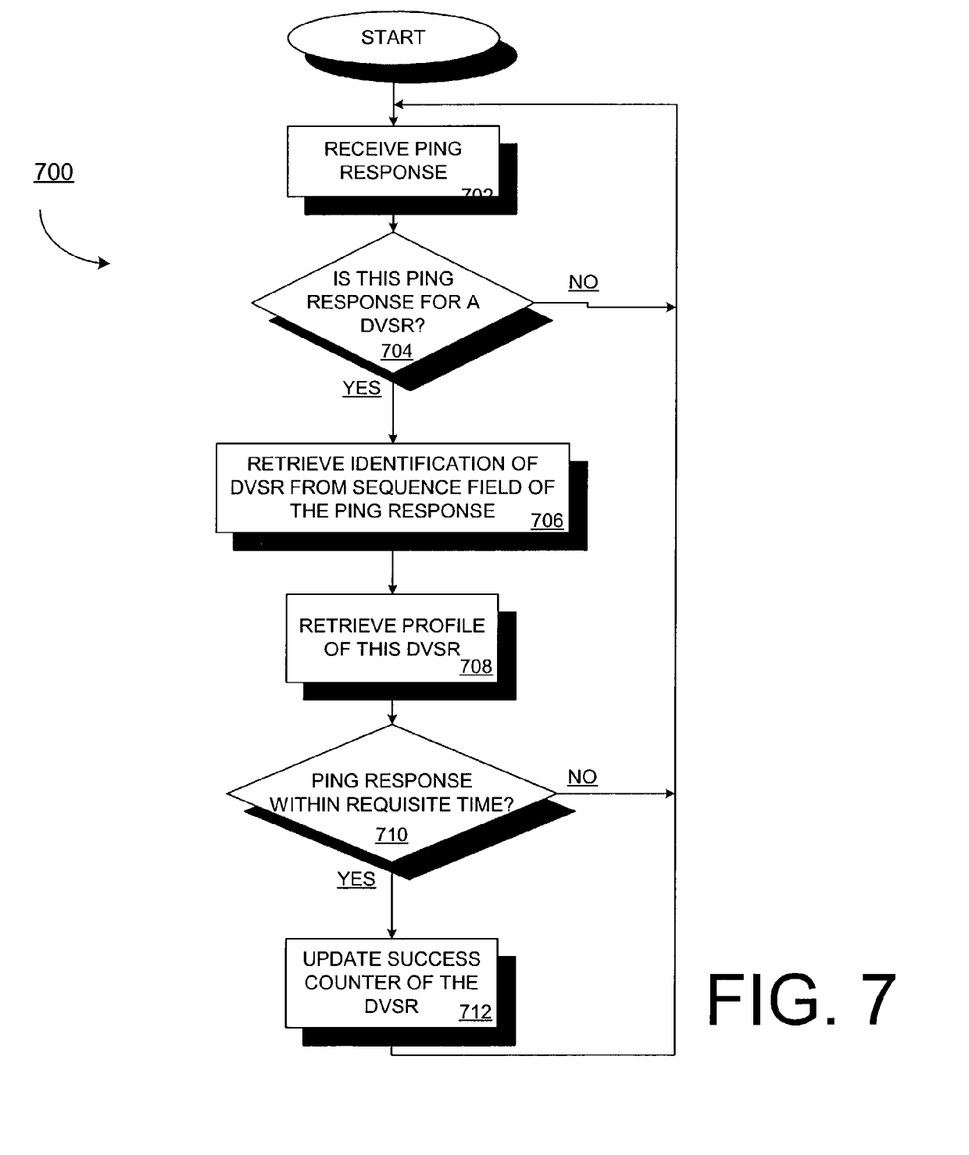
FIG. 7 illustrates a more detailed flow diagram for processing responses to PINGs for static routes, according to one embodiment of the invention.

FIGS. 1-3 show block diagrams of systems for updating availability of routes in a network, in accordance with embodiments of the invention. FIGS. 4, 5 and 7 shows flow diagrams illustrating operations for updating availability of routes in a network, according to embodiments of the invention. The operations of the flow diagrams will be described with references to the systems shown in the block diagrams. However, it should be understood that the operations of the flow diagrams could be performed by embodiments of systems other than those discussed with reference to the block diagrams, and embodiments discussed with reference to the systems could perform operations different than those discussed with reference to the flow diagrams.

FIG. 1 illustrates a block diagram of a system for updating the availability of routing in a network, according to one embodiment of the invention. As shown, FIG. 1 illustrates a system 100 that includes a network 102, a network element 104, a network element 106, a number of servers 108A-108I and a number of servers 110A-101I.

The network element 104 and the network element 106 are coupled to the network 102. In one embodiment, the network 102 is a local area network (LAN). In another embodiment, the network 102 is a wide area network (WAN). In an embodiment, the network 102 is the Internet. Further, the network 102 can be a combination of different networks that provide communication between the network element 104 and the network element 106. In one embodiment, the network 102 is comprised of a number of network elements that are coupled together to enabling the routing of data therein. While the network element 104 and the network element 106 can be different types of network elements, in one embodiment, the network element 104 and the network element 106 are edge routers in reference to the network 102.

The servers 108 are coupled to the network 102 through the network element 104. The servers 110 are coupled to the network 102 through the network element 106. In one embodiment, the servers 108 are part of a web farm for hosting a number of web pages and other data for web sites. In an embodiment, the servers 110 are part of a web farm for hosting a number of web pages and other data for web sites.

As will described in more detail below, in one embodiment, the network element 104 includes logic for announcing its routing information (including static routes) using dynamic routing protocols to other network elements and computing devices within and coupled to the network 102. In one embodiment, such logic within the network element 104 performs this announcing based on the Border Gateway Protocol (BGP). In one embodiment, such logic within the network element 104 performs this announcing based on the Interior Gateway Protocol (IGP).

Similarly, as will described in more detail below, in one embodiment, the network element 106 includes logic for announcing its routing information (including static routes) using dynamic routing protocols to other network elements and computing devices within and coupled to the network 102. In one embodiment, such logic within the network element 106 performs this announcing based on the Border Gateway Protocol (BGP). In one embodiment, such logic within the network element 106 performs this announcing based on the Interior Gateway Protocol (IGP).

The network element 104 and the network element 106 will now be described in more detail below. In particular, FIGS. 2 and 3 illustrate more detailed block diagrams of a network element for updating the availability of routing in a network, according to one embodiment of the invention. As shown in FIG. 2, the network element 104/106 includes a dynamic routing logic 202, a static routing protocol logic 204, a redistribution logic 206 and a dynamically verified static route (DVSR) logic 208.

In an embodiment, the dynamic routing protocol logic 202, the static routing protocol logic 204, the redistribution logic 206 and the dynamically verified static route (DVSR) logic 208 may be processes or tasks that can reside within a memory and/or processors (not shown) in the network element and can be executed within such processors therein. However, embodiments of the invention are not so limited, as the dynamic routing protocol logic 202, the static routing protocol logic 204, the redistribution logic 206 and the dynamically verified static route (DVSR) logic 208 may be different types of hardware (such as digital logic) executing the processing described therein (which is described in more detail below).

As shown, DVSR logic 208 is coupled to generate and transmit PINGs 210 and receive PING responses 212 in response to the PINGs 210. As will be described in more detail below, the DVSR logic 208 transmits PINGs 210 to the different servers 110 and 108. For example, for the network element 106, the DVSR logic 208 therein PINGs addresses associated with the different servers 110. In one embodiment, a number of addresses are associated with a number of servers 110. Accordingly, there are a number of static routes between the network element 106 and one of the servers 110. In an embodiment, an address and an associated static route are associated with given data (such as a web page) stored within one of the servers 110. Similarly, for the network element 104, the DVSR logic 208 therein PINGs addresses associated with the different servers 108. As will be described in more detail below, the DVSR logic 208 updates the static routes between the network element 104/106 and the servers 108/110 based on the PING responses 212 to the PINGs 210.

Additionally, as shown in FIG. 2, the DVSR logic 208 is coupled to the static routing protocol logic 204. The static routing protocol logic 204 is coupled to communicate with the redistribution logic 206. The redistribution logic 206 is coupled to communicate with the dynamic routing protocol logic 202. In an embodiment, the redistribution logic 206 distributes the updates made to the static routes by the DVSR logic 208 to the dynamic routing protocol logic 202. In one embodiment, the dynamic routing protocol logic 202 communicates these modifications of the static routes to other network elements within and coupled to the network 102.

To better illustrate, FIG. 3 illustrates a more detailed block diagram of the DVSR logic 208 and a routing information base within the network elements 104/106, according to one embodiment of the invention. As shown, the DVSR logic 208 includes a timer logic 302, a routing verification structure 308, a PING logic 304 and a response logic 306.

In an embodiment, the timer logic 302, the PING logic 304 and the response logic 306 may be processes or tasks that can reside within a memory and/or processors (not shown) in the network element and can be executed within such processors therein. However, embodiments of the invention are not so limited, as the timer logic 302, the PING logic 304 and the response logic 306 may be different types of hardware (such as digital logic) executing the processing described therein (which is described in more detail below).

The routing verification structure 308 stores profiles related to the DVSRs (the static routes) coupled between the servers 108/110 and the network element 104/106. In one embodiment, for a given static route, the profile for a DVSR includes (1) an identification of the static route, (2) the time to live period for a given PING for this static route, (3) the verification interval between PINGs for this static route, (4) the number of PINGs that do not have corresponding PING responses prior to the static route being considered unavailable and (5) the number of PING responses prior to the static route being considered available. However, embodiments of the invention are not so limited. For example, in another embodiment, for a given static route, the profile for a given DVSR can include a lesser or greater number of such data. Other types of data that can be stored in a profile for a DVSR is described in more detail below.

In one embodiment, the routing verification structure 308 is configured as a tree-based data structure, wherein each node in such a tree is representative of a DVSR, wherein the profile of the DVSR is associated with this node. However, embodiments of the invention are not so limited, as other types of data structures can be employed in the storage of the profiles of the DVSRs within the routing verification structure 308. For example, in another embodiment, the routing verification structure 308 is configured as a table. In another embodiment based on an object-oriented environment, the static routes can be object instantiations of a class that includes the different entries of a profile for a DVSR.

Additionally, the routing verification structure 308 is coupled to the routing information base 310. The response logic 306 is coupled to the routing information base 310. In one embodiment, the routing information base 310 stores data related to the different static routes to which the network element 104/106 is coupled. In one embodiment, if an identification of a static route is stored within the routing information base 310, the static route is considered available. Accordingly, as will be described in more detail below, the redistribution logic 206 distributes the availability or lack thereof for a given static route to the dynamic routing protocol logic 202 based on the data stored in the routing information base 310. The dynamic routing protocol logic 202 announces whether the static routes are available to other network elements within the network. For example, if the identification of the static route is stored in the routing information base 310, the redistribution logic 206 communicates to the dynamic routing protocol logic 202 that this given static route is available. In turn, the dynamic routing protocol logic 202 announces the availability of this static route to other network elements in the network. Conversely, if the identification of the static route is removed from the routing information base 310, the redistribution logic 206 communicates to the dynamic routing protocol logic 202 that this given static route is not available. In turn, the dynamic routing protocol logic 202 announces that this static route is not available to other network elements in the network.

The operation for updating the availability of a static route within a network will now be described. In particular, FIG. 4 illustrates a flow diagram for updating the availability of a static route within a network, according to one embodiment of the invention. The operation of the flow diagram 400 will be described with reference to the exemplary systems shown FIGS. 1-3.

In block 402, PINGs are generated for static routes. With reference to the exemplary embodiment of FIG. 3, the PING logic 304 within the DVSR logic 208 generates PINGs for static routes, as shown by the PINGs 210. In one embodiment, the PING logic 304 modifies the data to be stored in a given PING. To help illustrate, FIG. 5 is a block diagram of a format for a PING, according to one embodiment of the invention. As shown, the PING format 500 includes a sender address 504, a receiver address 506 and a sequence field 508. Additionally, as is known in the art, the PING format can include other fields therein. The sender address 504 is the address of the device that is transmitting the PING. In the current example, the sender address 504 is the address of the network element 104/106. In one embodiment, the sender address 504 is specified explicitly within a DVSR profile. The receiver address 506 is the address of the device to which the PING is being transmitted. In the current example, the receiver address 506 is the address of the server 108/110 that includes the data that is being PINGed.

For a typical PING operation, the sequence field 508 is employed to identify which PING a given PING response is associated. In particular, in a typical operation, the sending device can transmit more than one PING prior to receipt of a PING response. Accordingly, when a PING response is received, this response includes the value of the sequence field that was stored in the PING, thereby allowing the sending device to match the PING with the correct PING response. In an embodiment, the value stored in the sequence field is modified to store the identification of the DVSR for the data that is being PINGed. A number of DVSRs can be associated with a given server 108/110. In an embodiment, a given DVSR is associated with given data (such as a web page for a web site) stored in the server 108/110. Accordingly, in an embodiment, the sequence field 508 identifies the DVSR for the data that is being PINGed. As will be described in more detail below, the response to the PING includes this sequence field, thereby enabling the response logic 306 to match the PING with the PING response.

While described such that the sequence field 508 is employed to exclusively identify the identification of the DVSR, embodiments of the invention are not so limited. For example, in an embodiment, a portion of the sequence field 508 (e.g., the first and/or first/second bits) can identify the sequence for the PING, while the remaining portions of the PING format after the sequence field 508 can identify the DVSR for this PING. In one embodiment, the sequence field 508 is encoded with both the identification of the DVSR and the sequence for the PING. Returning to the flow diagram 400, control continues at block 404.

In block 404, the responses to the PINGs are tracked. With reference to the exemplary embodiment of FIG. 3, the response logic 306 within the DVSR logic 208 tracks the responses to the PINGs, as shown by the PING responses 212. As will be described in more detail below, for a given PING for a static route, the response logic 306 tracks whether a response is returned from the server 108/110 for associated data being PINGed. In an embodiment, the response logic 306 tracks the number of responses received based on the different PINGs transmitted for a given static route. In one embodiment, the response logic 306 tracks the number of responses that were not received based on the different PINGs transmitted for a given static route. Control continues at block 406.

In block 406, announcements of the changes related to the availability of the static routes are caused based on the responses to the PINGs. With reference to the exemplary embodiment of FIG. 3, the response logic 306 within the DVSR logic 208 causes the announcements of the changes related to the availability of the static routes based on the responses to the PINGs. In one embodiment, the response logic 306 causes these announcements of the changes related to the availability of the static routes by updating the routing information base 310. For example, if the static route is currently stored in the routing information base 310 (thereby indicating that this route is available) and if the response logic 306 does not receive a predetermined number of responses to a number of PINGs, the response logic 306 deletes this static route from the routing information base 310 (as the response logic 306 is assuming that the route is no longer available). To further illustrate, if the static route is not currently stored in the routing information base 310 (thereby indicating that this route is not available) and if the response logic 306 receives a predetermined number of responses to a number of PINGs, the response logic 306 adds this static route into the routing information base 310 (as the response logic 306 is assuming that the route is now available).

Figure 6:
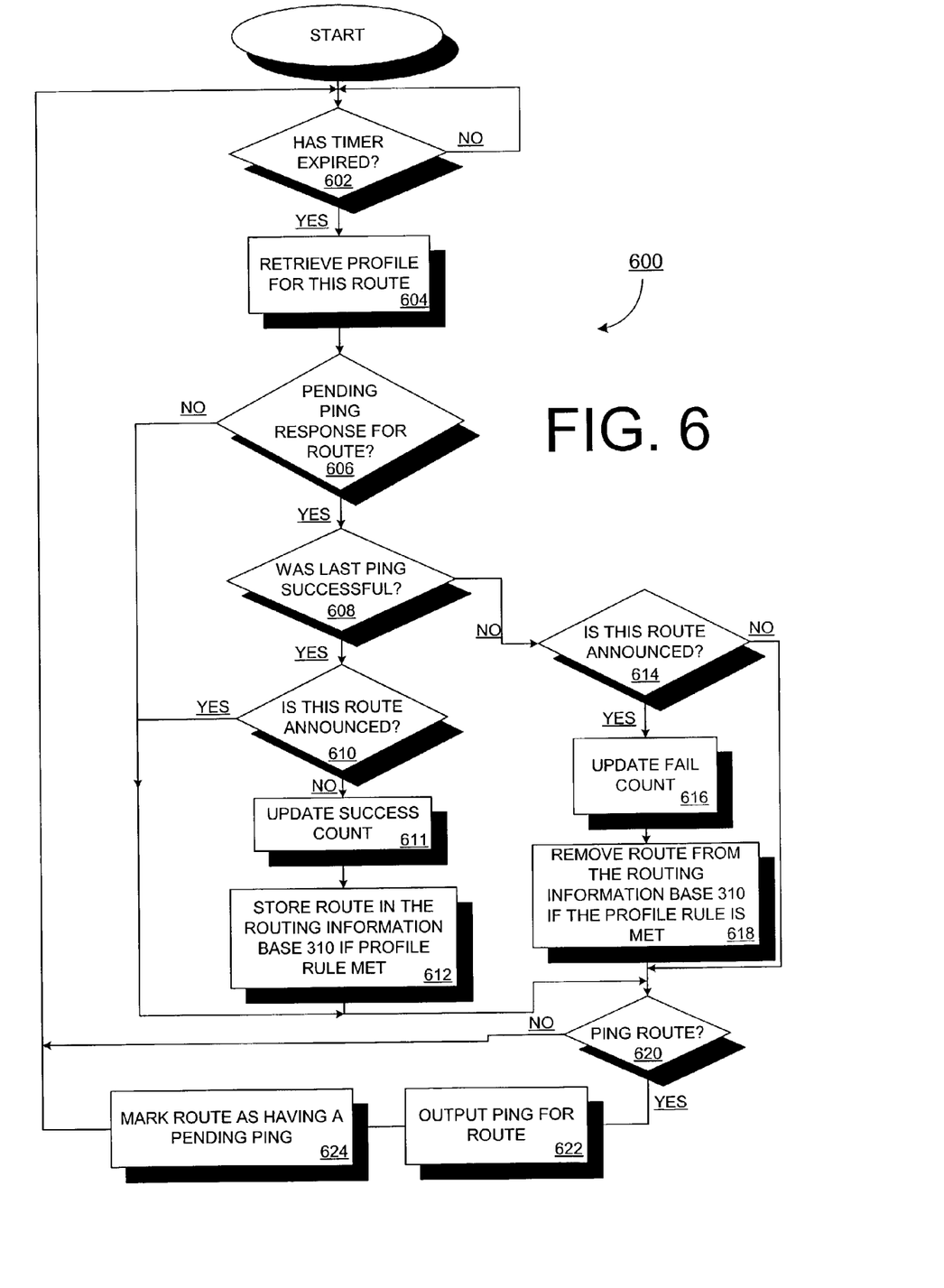
FIG. 6 illustrates a more detailed flow diagram for generating PINGs and causing the announcements of the availability of static routes based on responses to such PINGs, according to one embodiment of the invention.

FIG. 6 illustrates a more detailed flow diagram for generating PINGs and causing the announcements of the availability of static routes based on responses to such PINGs, according to one embodiment of the invention. The operation of the flow diagram 600 will be described with reference to the exemplary systems shown FIGS. 1-3.

In block 602, a determination is made on whether a timer is expired. With reference to the exemplary embodiment of FIG. 3, the timer logic 302 determines whether the timer has expired. In an embodiment, the timer logic 302 decrements a value of a timer. Once this value is zero, the timer is considered expired. Upon determining that the timer has not expired, the timer logic 302 continues making this determination in block 602.

In block 604, upon determining that the timer for this DVSR has expired, the profile for the DVSR is retrieved. With reference to the exemplary embodiment of FIG. 3, the response logic 306 retrieves the profile for the DVSR from the routing verification structure 308.

In block 606, a determination is made on whether there is a pending PING response for this DVSR. With reference to the exemplary embodiment of FIG. 3, the response logic 306 makes this determination. In one embodiment, the profile for the DVSR includes an entry that indicates whether a PING has been transmitted by the PING logic 304 for which a PING response has not been received. Upon determining that there is not a pending PING response for this DVSR, the operations continues in block 620, which is discussed in more detail below.

In block 608, upon determining that there is a pending PING response for this DVSR, a determination is made on whether the last PING was successful. With reference to the exemplary embodiment of FIG. 3, the response logic 306 determines whether a PING response was received in the requisite time frame for the previous PING that was transmitted for this PING. In one embodiment, the response logic 306 makes this determination by checking the value of the success counter stored in the profile for this DVSR. If this success counter is greater than zero, the response logic 306 determines that the last PING was successful. Conversely, if this success counter equals zero, the response logic 306 determines that the last PING was not successful.

In block 610, upon determining that the last PING was successful, a determination is made on whether this route is announced. With reference to the exemplary embodiment of FIG. 3, the response logic 306 determines whether this route is announced by querying the routing information base 310. In one embodiment, if the DVSR is stored in the routing information base 310, the route is considered announced. Upon determining that the DVSR is announced, the flow diagram 600 continues in block 620 (which is discussed in more detail below).

In block 611, upon determining that the DVSR is not announced, the success count is updated. With reference to the exemplary embodiment of FIG. 3, the response logic 306 updates the success count. In an embodiment, the profile for a DVSR includes the success count, which is a value indicating the number of times in a row that a PING was considered successful. In an embodiment, a PING is considered successful if a PING response was received within the requisite time. Accordingly, in an embodiment, the response logic 306 increments the success count by one during the update for this counter. Control continues at block 612.

In block 612, the route is stored in the routing information base 310 if the profile rule is met for this DVSR. With reference to the exemplary embodiment of FIG. 3, the response logic 306 stores the DVSR into the routing information base 310 if the profile rule is met for this DVSR. As described above, in one embodiment, a profile for a DVSR includes a value indicating the number of PING responses needed to be received within a requisite time in order for the DVSR to be considered available. Accordingly, in one embodiment, the profile rule for this DVSR is considered met when the number of successful PING responses received by the response logic 306 equals such a value stored in the profile for this DVSR. Control continues at block 620 (which is discussed in more detail below).

In block 614, upon determining that the last PING was not successful, a determination is made on whether this route is announced. With reference to the exemplary embodiment of FIG. 3, the response logic 306 determines whether this route is announced by querying the routing information base 310. In one embodiment, if the DVSR is stored in the routing information base 310, the route is considered announced. Upon determining that this route is not announced, the flow diagram 600 continues in block 620 (which is described in more detail below).

In block 616, upon determining that this route is successful, the fail count is updated. With reference to the exemplary embodiment of FIG. 3, the response logic 306 updates the fail count. In an embodiment, the profile for a DVSR includes the fail count, which is a value indicating the number of times in a row that a PING was not considered successful. In an embodiment, a PING is not considered successful if a PING response was received but not within the requisite time or if a PING response was not received. Accordingly, in an embodiment, the response logic 306 increments the fail count by one during the update for this counter. Control continues at block 618.

In block 618, the route is deleted from the routing information base 310 if the profile rule is met. With reference to the exemplary embodiment of FIG. 3, the response logic 306 deletes the route from the routing information base 310 if the profile rule is met for this route. In one embodiment, a profile for a DVSR includes a fail count value indicating the number of times in a row that a PING response was not received for a PING or received, but not within the requisite time for this DVSR. In an embodiment, a profile for a DVSR includes a value representative of the number of times in a row that a PING response can fail prior to the route being identified as being "down". If the fail count value exceeds this value that cannot be exceeded prior to a route being identified as being "down", this profile rule is considered met and the response logic 306 deletes the route from the routing information base 310. Control continues at block 620.

In block 620, a determination is made on whether a route should be PINGed. With reference to the exemplary embodiment of FIG. 3, the PING logic 304 makes this determination. As described above, in one embodiment, a profile for a DVSR includes the verification interval between PINGs for this static route. Accordingly, the PING logic 304 determines if requisite amount of time defined by this verification interval as expired since the last PING response in determining if this route should be PINGed. Upon determining that this requisite time has not expired, the flow diagram 600 continues processing in block 602.

In block 622, upon determining that this requisite time has expired, a PING is outputted for this route. With reference to the exemplary embodiment of FIG. 3, the PING logic 304 outputs the PING for this route. As described above in conjunction with FIG. 5, in an embodiment, the PING logic 304 generates a PING wherein the sequence field therein includes the identification of this given DVSR. Control continues at block 624.

In block 624, this route is marked as having a pending PING. With reference to the exemplary embodiment of FIG. 3, the PING logic 304 marks this route as having a pending PING. In one embodiment, the PING logic 304 marks this route by updating a value within the profile for this DVSR that indicates if a PING is pending. The operations of the flow diagram 600 continues in block 602.

While the flow diagram 600 illustrates the processing of one DVSR, in an embodiment, when the timer expires, the operations described for the flow diagram 600 are performed for each of the DVSRs stored within the routing verification structure 308. For example, in an embodiment, wherein the DVSRs are stored in a tree-based data structure, such a structure is traversed when the timer is expired (as determined in block 602) such that each DVSR is processed according to the operations described in the flow diagram 600.

The processing of the responses to the PINGs for the static routes will now be described. FIG. 7 illustrates a more detailed flow diagram for processing responses to PINGs for static routes, according to one embodiment of the invention. The operation of the flow diagram 700 will be described with reference to the exemplary systems shown FIGS. 1-3.

In block 702, a PING response is received. With reference to the exemplary embodiment of FIG. 3, the response logic 306 receives this PING response. As described above, the PING logic 304 generates a PING for a given static route that is associated with a given address for data stored in the servers 108/110. In an embodiment, if the link is "up" and the server 108/110 is operational, the server 108/110 will respond to the PING with a PING response. In an embodiment, the PING response includes the sequence field that was stored in the PING that is being responded to. As described above, in one embodiment, the sequence field includes a value that identifies the DVSR associated with the address that is being PINGed within the server 108/110.

In block 704, a determination is made of whether this PING response is for a DVSR. With reference to the exemplary embodiment of FIG. 3, the response logic 306 makes this determination. In one embodiment, the response logic 306 makes this determination based on the sender address within the PING response. In an embodiment, this PING response can be for a DVSR if the sender address within the PING response is the addresses of one of the servers 108/110. Upon determining that the PING response is not for a DVSR, the operations return to receiving the next PING response in block 702.

In block 706, upon determining that the PING response is for a DVSR, the identification of the DVSR is retrieved from the sequence field of the PING response. With reference to the exemplary embodiment of FIG. 3, the response logic 306 retrieves the identification of the DVSR from the sequence field of the PING response.

In block 708, the profile for this DVSR is retrieved. With reference to the exemplary embodiment of FIG. 3, the response logic 306 retrieves the profile for this DVSR from the routing verification structure 308. As described above, the profile for a DVSR comprises a number of fields that, in an embodiment, are associated with a node for a tree-based data structure within the routing verification structure 308. Accordingly, in an embodiment, the response logic 306 traverses the tree to locate the profile for the DVSR based on its identification.

In block 710, a determination is made of whether the PING response is within the requisite time. With reference to the exemplary embodiment of FIG. 3, the response logic 306 makes this determination. As described above, in an embodiment, the profile for a DVSR includes a time to live period for a given PING. Accordingly, the response logic 306 compares the time to live period for this PING to the amount of time between the transmission of the PING and the associated PING response. For example, in an embodiment, the time when the PING is transmitted is recorded within the profile of the DVSR. Therefore, when the PING response is received, the time of the PING response is subtracted from the time when the PING is transmitted. In an embodiment, the response logic 306 compares this difference in time to the time to live period stored in the profile for this DVSR. The PING response is within the requisite time if the time to live period is less than this difference in time between the PING transmission and the PING response. Upon determining that the PING response is not within the requisite time, the PING was not considered successful and the operations of the flow diagram 700 return to receive a next PING response in block 702.

In block 712, upon determining that the PING response is within the requisite time, the success counter of the DVSR is updated. With reference to the exemplary embodiment of FIG. 3, the response logic 306 updates the success counter of this DVSR. In an embodiment, a profile of the DVSR includes this success counter, which tracks the number of PING responses that have been received within the requisite time, since a PING response has not been received within the requisite time. As described above in conjunction with FIG. 6, based on this success counter, the response logic 306 stores this DVSR into the routing information base 310.

While embodiments of the invention have been described with reference to a system based on communications between a number of servers within a web farm and an edge router, embodiments of the invention are not so limited. Examples of other systems that can incorporate embodiments of the invention include Internet Service Provides (ISP) customer point-to-multipoint communications using Frame Relay Permanent Virtual Circuits (PVCs), Asynchronous Transfer Mode (ATM) PVCs, GRE tunnels, Ethernet, virtual Local Access Networks (vLANs), etc.

Another system that can incorporate embodiments of the invention includes a system having a number of edge routers coupled to a number of workstations acting as firewalls for communications by a number of computing devices to the edge routers and devices coupled thereto. In such an embodiment, there are static routes between the edge routers and the workstations. Accordingly, the operations described herein can be performed between the edge routers and the workstations to ensure that a given workstation is no longer in operation.

Another system that can incorporate embodiments of the invention includes a system having a number of access points via edge routers to a customer network. In an embodiment, other routers coupled to the edge routers can perform the communications and operations with the edge routers to ensure that if one edge router is down, then this link can be announced as "down" and thereby allowing communications to the customer network via the other edge routers.

The network elements and servers include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and apparatus for updating the availability of routes in a network have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   transmitting a PING message from a network element to a computing device, wherein a static route is between the network element and the computing device and the static route is manually provisioned, and wherein the PING message comprises a sequence field that includes an identification of the static route and a PING message sequence number;
   dynamically verifying the availability of the static route based on whether the computing device responded to the PING message; and
   causing a distribution of availability of the static route to at least one other network element based on whether the computing device responded to the PING message.

2. The method of claim 1, comprising announcing modifications of the static route to the at least one other network element based on a dynamic routing protocol.

3. The method of claim 1, wherein causing the distribution of the availability of the static route comprises updating a routing table stored within the network element.

4. The method of claim 3, wherein causing the distribution of the availability of the static route comprises deleting the entry for the static route from the routing table upon not receiving responses to a predetermined number of PING messages.

5. The method of claim 3, wherein causing the distribution of the availability of the static route comprises adding the entry for the static route to the routing table upon receiving responses to a predetermined number of PING messages.

6. A method comprising:
   generating, by a network element, a number of PING messages, wherein a sequence field of the PING messages is to include a PING message sequence number and an identification of a dynamically verified static route from among a number of dynamically verified static routes between the network element and a device, wherein the dynamically verified static route is associated with data of a number of data stored in the device and the dynamically verified static route is manually provisioned;
   transmitting the number of PING messages to the device from the network element;
   announcing the unavailability of the data to other network elements, upon not receiving a predetermined number of responses to the number of PING messages from the device; and
   announcing the availability of the data to other network elements, upon receiving a predetermined number of responses to the number of PING messages from the device.

7. The method of claim 6, wherein announcing the unavailability of the data comprises announcing the unavailability of the data based on a dynamic routing protocol.

8. The method of claim 6, wherein announcing the availability of the data comprises announcing the availability of the data based on a dynamic routing protocol.

9. The method of claim 6, wherein data stored in the sequence field of the PING messages include an encrypted value that includes the sequence number for the PING message and the identification of the data stored in the device.

10. The method of claim 6, wherein the dynamically verified static route is associated with data of a number of data stored in the device.

11. A network element comprising:
    a routing table to store entries related to a number of static routes between the network element and a number of data within a computing device, wherein the number of static routes is manually provisioned; and
    a dynamically verified static route logic to PING the number of data within the computing device with a PING message, the dynamically verified static route logic to update the entries related to the number of static routes within the routing table based on the responses to the PING messages from the computing device, and wherein each of the PING messages comprises a sequence field that includes a PING message sequence number and an identification of one of the number of static routes.

12. The network element of claim 11, wherein each of the number of data within the computing device is associated with a different static route of the number of static routes.

13. The network element of claim 11, comprising a redistribution logic to forward the update to the routing table for the number of static routes to a dynamic routing protocol logic, wherein the dynamic routing protocol logic is to announce the update to the number of static routes to at least one other network element coupled to the network element.

14. The network element of claim 11, wherein the dynamically verified static route logic is to delete an entry within the routing table for a static route upon not receiving responses to a predetermined number of PING messages.

15. The network element of claim 11, wherein the dynamically verified static route logic is to add an entry within the routing table for a static route upon receiving responses to a predetermined number of PING messages.

16. The network element of claim 11, wherein the dynamically verified static route logic is to store the identification of the data that is being PINGed within the computing device within the sequence field of the PING messages.

17. The network element of claim 16, wherein the dynamically verified static route logic is to store an encrypted value into the sequence field of the PING messages, the encrypted value to include the identification of the data that is being PINGed within the computing device and the sequence number of the PING message.

18. A machine-readable medium that provides instructions, which when executed by a machine, cause said machine to perform operations comprising:
    transmitting a PING message from a network element to a computing device, wherein a static route is between the network element and the computing device and the static route is manually provisioned, and wherein the PING message comprises a sequence filed that includes an identification of the static route and a PING message sequence number;
    dynamically verifying the availability of the static route based on whether the computing device responded to the PING message; and
    causing a distribution of availability of the static route to at least one other network element based on whether the computing device responded to the PING message.

19. The machine-readable medium of claim 18, comprising announcing modifications of the static route to the at least one other network element based on a dynamic routing protocol.

20. The machine-readable medium of claim 18, wherein causing the distribution of the availability of the static route comprises updating a routing table stored within the network element.

21. The machine-readable medium of claim 20, wherein causing the distribution of the availability of the static route comprises deleting the entry for the static route from the routing table upon not receiving responses to a predetermined number of PING messages.

22. The machine-readable medium of claim 20, wherein causing the distribution of the availability of the static route comprises adding the entry for the static route to the routing table upon receiving responses to a predetermined number of PING messages.

23. A machine-readable medium that provides instructions, which when executed by a machine, cause said machine to perform operations comprising:
   generating, by a network element, a number of PING messages, wherein a sequence field of the PING messages is to include a PING message sequence number and an identification of a dynamically verified static route from among a number of dynamically verified static routes between the network element and a device, wherein the dynamically verified static route is associated with data of a number of data stored in the device and the dynamically verified static route is manually provisioned;
   transmitting the number of PING messages to the device from the network element;
   announcing the unavailability of the data to other network elements, upon not receiving a predetermined number of responses to the number of PING messages from the device; and
   announcing the availability of the data to other network elements, upon receiving a predetermined number of responses to the number of PING messages from the device.

24. The machine-readable medium of claim 23, wherein announcing the unavailability of the data comprises announcing the unavailability of the data based on a dynamic routing protocol.

25. The machine-readable medium of claim 23, wherein announcing the availability of the data comprises announcing the availability of the data based on a dynamic routing protocol.

26. The machine-readable medium of claim 23, wherein data stored in the sequence field of the PING messages include an encrypted value that includes a sequence for the PING message and the identification of the data stored in the device.

27. The machine-readable medium of claim 23, wherein the dynamically verified static route is associated with data of a number of data stored in the device.

* * * * *

UNITED STATES PATENT AND TRADEMARK OFFICE
CERTIFICATE OF CORRECTION

PATENT NO. : 7,698,438 B1
APPLICATION NO. : 10/281619
DATED : April 13, 2010
INVENTOR(S) : Shen It is certified that error appears in the above-identified patent and that said Letters Patent is hereby corrected as shown below:

In Column 5, Line 3, delete "110A-101I." and insert -- 110A-110I. --, therefor.

In Column 14, Lines 3-5, delete Claim "10. The method of claim 6, wherein the dynamically verified static route is associated with data of a number of data stored in the device."

In Column 16, Lines 24-26, delete Claim "27. The machine-readable medium of claim 23, wherein the dynamically verified static route is associated with data of a number of data stored in the device."

Signed and Sealed this

Twenty-first Day of September, 2010

David J. Kappos
*Director of the United States Patent and Trademark Office*